SEMICONDUCTOR SWITCH CIRCUIT
Original Filed Feb. 13, 1961
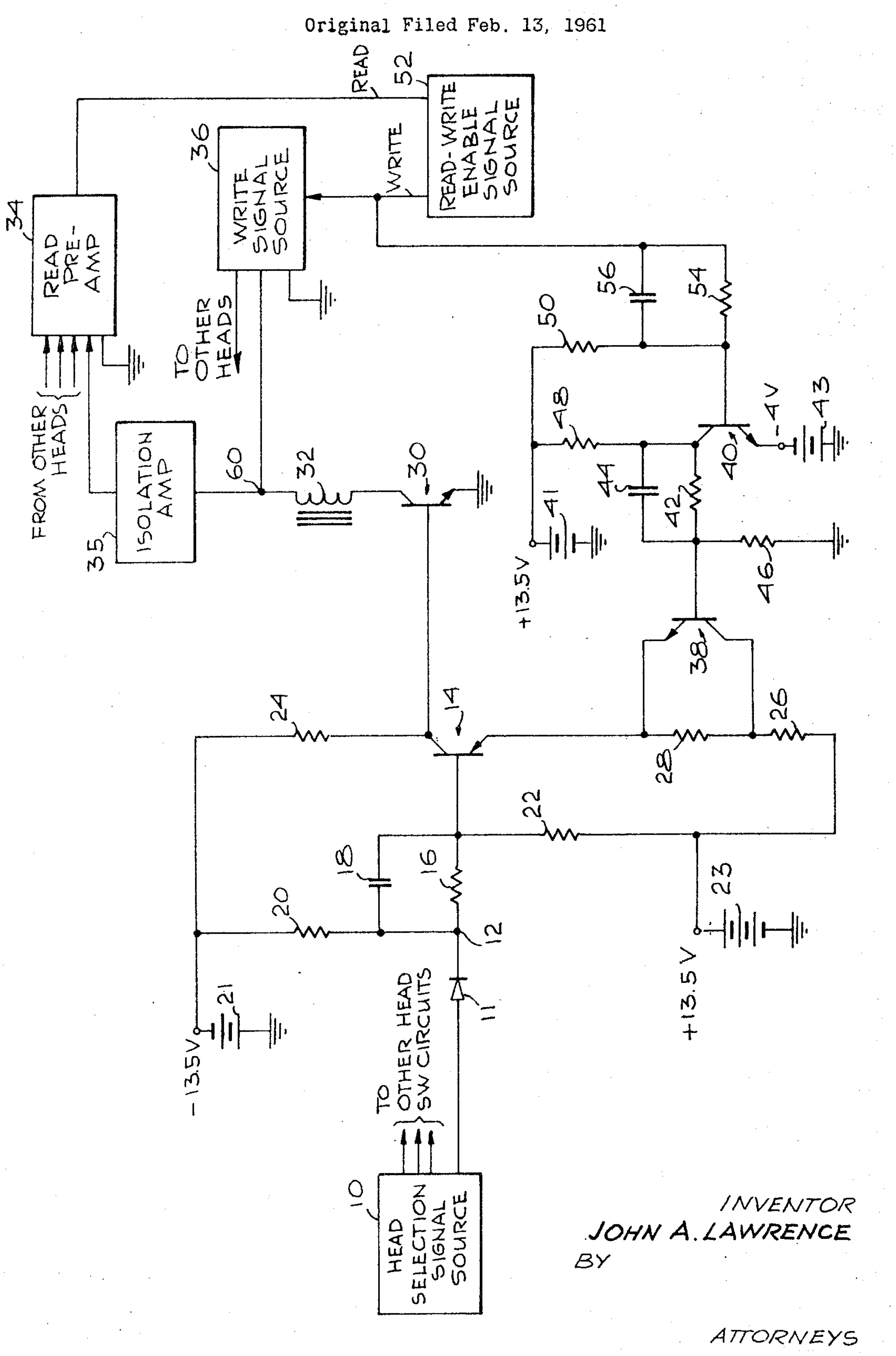
INVENTOR
JOHN A. LAWRENCE
BY
ATTORNEYS

United States Patent Office 3,458,725

Patented July 29, 1969

3,458,725

SEMICONDUCTOR SWITCH CIRCUIT

John A. Lawrence, Canoga Park, Calif., assignor, by mesne assignments, to The Bunker-Ramo Corporation, Stamford, Conn., a corporation of Delaware Original application Feb. 13, 1961, Ser. No. 88,983, now Patent No. 3,182,298, dated May 4, 1965. Divided and this application Dec. 21, 1964, Ser. No. 425,103

Int. Cl. H03k 17/56, 17/66

U.S. Cl. 307—249 2 Claims

ABSTRACT OF THE DISCLOSURE

A semiconductor switch circuit particularly useful for conducting read current from and write current to, a transducer in a magnetic recording system. The circuit utilizes a transistor whose collector and emitter are connected in a common path for current to and from the transducer. Means are provided for biasing the transistor to be nonconductive when the transducer is to be inoperative and for applying drive currents of first and second levels to the base of the transistor for respectively passing read and write currents of substantially different levels through the common path.

The present application is a division of the application from which U.S. Patent No. 3,182,298 has matured.

This invention relates to semiconductor switching circuits particularly useful with magnetic transducers used in magnetic recording systems.

In magnetic recording systems, in order to write on a magnetic medium employing a magnetic transducer, it is necessary to apply a current having the signal variations to the windings of such transducer. When the the same transducer is employed for reading what has been recorded on the magnetic-recording medium, current at a much lower level flows through its windings. Thus, the applied power for writing is at a much higher level than the power derived from the magnetic medium during the process of reading.

In a modern computer using a moving magnetic medium for data storage, usually, a large number of these magnetic-transducers are employed and some form of circuitry must be provided for switching or selecting them at will. Such a switch must be capable of handling both the writing and reading power levels. Furthermore additional problems arise when recording signals are employed which can be considered as alternating current signals. In the present state of the art, at least two complementary power transistors are employed for use as a switching element for writing. A separate and different circuit is used for reading. Complementary transistors are employed so that PNP-type transistor conducts the negative-going current while the NPN-type transistor conducts the positive-going current component of the alternating current writing signal.

An object of this invention is the provision of a switch circuit useful with a magnetic-recording head.

Another object of this invention is the provision of a switch circuit which employs components which are inexpensive, readily available and of proven reliability.

Another object of this invention is to provide a novel switching circuit for magnetic recording heads which can be used for both the reading and writing operation.

Yet another object of the present invention is the provision of a switching circuit of the type described wherein less space is required and therefore better packaging thereof may be effectuated.

These and other objects of the invention are achieved in an arrangement wherein a transistor is connected in a path so that alternating current of two substantially different levels can flow through the path in either direction. A circuit arrangement is connected to the base of the transistor to selectively provide either a high or low level of base-drive current.

Reference is now made to the drawing, which is a circuit diagram of an embodiment of the invention. A rectangle bearing reference numeral 10 and labeled head selection signal source is representative of any arrangement which is employed for selecting either for writing or reading any one or more of a plurality of magnetic transducers. Such arrangements can provide output signals which enable circuitry associated with the transducer to be selected. Thus, the head selection signal source 10 can apply a signal to the input terminal 12 of the embodiment of the invention, when it is desired that a particular recording head, which is associated with that circuitry be enabled to either write or read.

Terminal 12 is connected to the base of a transistor 14 through a resistor 16, which is also connected in parallel with a capacitor 18. The resistor 20 is connected from a source of negative potential 21 here represented as −13.5 volts to the terminal 12. Another resistor 22 is connected from a source of positive potential 23, here represented as +13.5 volts to the base of the transistor 14. Thus, transistor 14 is held biased off by the potential established as the result of the current flow through the three resistors 22, 16 and 20. A collector load resistor 24 is connected between the negative potential source 21 and the collector of the transistor 14. First and second current-limiting resistors, respectively, 26, 28 are connected in series and from the positive potential source 23 to the emitter of transistor 14. Transistor 14 is here shown as the PNP type.

The collector of transistor 14 is connected to the base of an NPN transistor 30. The emitter of this transistor 30 is connected to ground. The collector of this transistor is connected to one end of the winding of the magnetic-transducer or read-write head 32. The other end of the winding is connected to an isolation amplifier 35 and to a write signal source 36. These latter circuits are not a part of this invention. They comprise well-known arrangements for either providing signals which are to be recorded on a magnetic medium or for amplifying signal currents which have been induced in the winding of the magnetic-transducer as the result of the motion of the magnetized recording medium.

An NPN transistor 38 has its emitter connected to one side of resistor 28 and its collector connected to the other side of resistor 28. Transistor 38 can be driven to be conductive in saturation or to be nonconductive in response to the signal applied to the base thereof by transistor 40. Transistor 40, an NPN transistor, has its collector coupled to the base of transistor 38 by means of a resistor 42. A capacitor 44 is connected in parallel with this resistor. Another resistor 46 is coupled between the base of transistor 38 and ground. The collector of transistor 40 is connected to a positive potential source 41 through a resistor 48. The emitter of transistor 40 is connected to a negative bias potential source 43. A resistor 50 connects the base of transistor 40 to the 13.5 volt positive potential source 41.

A rectangle 52 designated as "read-write enable signal source," represents circuitry which serves the function of providing a signal to the read preamplifier 34 when it is desired to amplify the signals which are derived from the magnetic medium by the magnetic transducer 32. The write signal is held off at this time. Another signal is provided to the write signal source to enable it to provide signals to the magnetic-transducer 32 which should be recorded upon the magnetic medium. The read circuit is off at this time. The signal from the read-write enable signal source 52 which is applied to the write signal source 36 is also applied to the base of transistor 40 through a resistor 54 across which there is also connected a capacitor 56.

In the quiescent or stand-by condition when neither reading nor writing is desired, transistor 14 is maintained nonconductive and transistor 30 is also maintained nonconductive by reason of its base being held negative. Transistors 40 and 38 are also maintained nonconductive. Assume now that it is desired to write alternating-current signals from the write signal source 36 using the magnetic transducer 32. The head selection signal source 10 is actuated to apply a negative signal (here on the order of −13.5 volts) to terminal 12. This causes transistor 14 to become conductive. As a result, the base of transistor 30 will be driven positive by an amount which is determined by the emitter base junction potential of transistor 30. The write signal from the read-write enable signal source is applied to the base of transistor 40 through the resistor 54 rendering it conductive. Transistor 40 amplifies the signal applied thereto and applies it to the base of transistor 38 rendering the transistor conductive into saturation. The effect of transistor 38 becoming conductive in saturation is to effectively shunt out resistor 28. As a result, resistor 26 alone determines the value of the drive current which is applied to the base of transistor 30. It will be appreciated that this drive current will be greater when resistor 28 is shunted out by transistor 38 then when tarnsistor 38 is not operative to shunt out or by-pass the resistor 28.

Alternating-current writing signals which are provided by the write signal source 36 are applied between the terminal 60 to which the write signal source and the magnetic-recording head are connected and ground. When this applied voltage is such that the collector of transistor 30 is positive, the transistor behaves normally, the heavy base drive current received from the transistor 14 causes transistor 30 to be driven into saturation, and write current will flow down through the recording head and transistor to ground. The potential at the collector transistor 30 will be at the saturation voltage of the transistor, which may be on the order from 0.1 volt to 0.5 volt depending upon the unit and/or type of transistor used. Transistor 30 is now operating in regular grounded emitter configuration.

When the polarity of the alternating-current voltage applied to the transistor 32 reverses, in effect, the configuration of the transistor 30 reverses with it. The collector of the transistor becomes the emitter and the emitter becomes the collector. The base drive to transistor 30 stays practically constant, but the base current now flows from the base of transistor 30 up through the collector (now acting as emitter) and through the magnetic-transducer head 32. Since, with the reverse polarity the electrode shown as the emitter of transistor 30 is now acting as collector, the transistor is correctly biased, and write current will flow up through the transistor 30 and through the head 32 back to the write signal source. Again, transistor 30 will be in saturation. The voltage at the collector of transistor 30 (now acting as emitter) will be at the saturation voltage or on the order from −0.2 volt to 0.5 volt. With write current flowing in this direction transistor 30 is operating in grounded collector (emitter follower) configuration. It may be seen then that the voltage at the collector (now acting as emitter) is kept close to ground potential by maintaining ample drive current into the base of the transistor 30. This base current keeps the base at the emitter-base or collector-base junction potential.

It should be noted that in the process of writing very little alternating current potential appears across the transistor 30. Thus most of the AC signal is applied across the recording head producing the necessary write current through it. The base drive current into transistor 30 is limited by resistor 26 which is in series with the emitter of transistor 14. The amount of base drive current should be set so that it will be sufficient to produce the required write current for the lowest inverse beta likely to be encountered for a given transistor type. It has been found that amongst the various types, both PNP and NPN, of alloy junction transistors used in this switching configuration, nearly all exhibit an acceptable symmetry, beta-wise, as the transistor reverses its configuration.

To turn the transistor switch off, the selection signal applied to terminal 12 by the head selection signal source 10 goes to ground potential thereby turning off the transistor 14, removing the current drive from the base of transistor 30, which then goes to a potential on the order of −13.5 volts. Both junctions of this transistor, emitter-base and collector-base are back biased. Current can no longer flow through the transistor in either direction, no matter what the polarity of the applied AC voltage. However, it should be noted that the peak amplitude of the AC signal must not go more negative than the back bias applied to the base, or the switch transistor 30 will no longer be off.

When it is desired to read the signals which have been recorded on the magnetic medium, using the recording head 32, the head selection signal source 10 applies a −13.5 volt signal to the terminal 12 rendering the transistor 14 conductive. The read-write enable signal source 52 applies an enabling signal to the read preamplifier 34. Since no enabling signal is applied to the base of transistor 40, it, together with transistor 38, remains nonconductive and thus, resistor 28 is effectively connected in series with resistor 26 and serves to limit the base, base current which transistor 14 is enabled to supply to transistor 30. This base current is greated reduced since it is now limited by the two resistors 26 and 28 in series. In an embodiment of the invention which was built the base current was on the order of 200 to 300 microamperes. A lesser amount may cause attenuation of read back signal, and a greater amount can only tend to increase the magnitude of the switching transients. Thus, in the reading mode, it can be seen that the recording head now operates to provide alternating current signals. Operation of the transistor 30 is essentially the same as it was for the process of writing. As the potential applied to the transistor changes polarity, so does the configuration of the transistor. Of course, the power being handled is much less than in writing, but since the collector of transistor 30 is still held close to ground potential, a ground return for the recording head 32 is completed and a reading signal will appear at the input to the read preamplifier 34. With adequate base current, signal loss across the switching transistor 30 is so slight as to be negligible.

From the foregoing description, it will be appreciated that by using transistor 30 as a bilateral conducting device, a property heretofore ignored or guarded against, a transistor may be used for conducting alternating currents. An inexactness of the natural bilateral symmetrical properties of transistors, which exhibit such characteristics to a greater or lesser degree, are compensated for by the driving circuitry. Since the base of the switching transistor 30 is kept clamped close to ground when it is on, the base drive current is set to an adequate value for all betas which are to be encountered. Storage time is not a problem since the base drive is constant. Minority carries merely change direction when current reverses through the transistor. When the switch is turned off by the drive circuit, a heavy negative current pulse is applied to the base to speed the turn-off time. Either PNP or NPN alloy junction transistors may be used as the switching transistor 30. It is simply a matter of providing the appropriate drive current. If a PNP transistor were used in place of the NPN transistor shown, then the transistor 14 would become an NPN type for driving the PNP type. The switch can then be turned on with a positive gate input.

Another advantage of this invention is that the signal loss across the switching transistor 30 is negligible in both modes of operation (reading or writing). This is particularly important in the read mode since there is a low-power level available at that time. Effectively, therefore, all the read-back signal will appear at the input to the read circuit and is a substantial advantage over read selection systems using a diode tree where only 50 to 60% of the signal actually reaches the read circuit. As was previously pointed out having a control drive current applied to the base of the switching transistor 30 effectively minimizes switching transients and keeps power dissipation in the switching transistor at a minimum.

There has accordingly been described herein above a novel, useful and simplified switching circuit finding most effective use with magnetic transducers used for writing and/or recording. However, this is to be construed as an example of the utility of the invention and not necessarily as a limitation thereon.

What is claimed is:

1. A switch circuit for controlling the flow of alternating current of relatively low and high levels through a common path comprising a switching transistor having collector, emitter, and base electrodes, means connecting said switching transistor emitter and collector electrodes serially into said common path, means for applying a bias to said switching transistor base to hold it nonconductive when it is desired to block the flow of current through said common path, and means for applying current to said switching transistor base at one level when relatively high-level current flows through said common path to enable said transistor to pass said high-level current and for applying current to said switching transistor base at a second level which is low relative to said one level when said low-level current flows through said common path.

2. A switch circuit as recited in claim 1 wherein said means for applying currents to said switching transistor base includes a control transistor having base, emitter and collector electrodes, means connecting said control transistor collector to said switching transistor base, a first and second resistor connected in series with said control transistor emitter, shunting-switch means connected across said first resistor, means for biasing off said control transistor and thereby said switching transistor, means for applying a signal to said control transistor to render it and said switching transistor conductive when it is necessary to conduct current through said common path, means for closing said switch means to bypass said first resistor when relatively high-level current flows through said common path, and means for maintaining said shunting-switch means open when low-level current flows through said common current path.

References Cited

UNITED STATES PATENTS 3,115,621 12/1963 Slavin ------------ 340—174.1

ARTHUR GAUSS, Primary Examiner

ROBERT H. PLOTKIN, Assistant Examiner

U.S. Cl. X.R.

307—255